(12) United States Patent
Woodhouse et al.

(10) Patent No.: US 8,641,994 B2
(45) Date of Patent: Feb. 4, 2014

(54) METHOD AND PLANT FOR $CO_2$ CAPTURING

(75) Inventors: Simon Woodhouse, Strommen (NO); Oscar Fredrik Graff, Hosle (NO)

(73) Assignee: Aker Clean Carbon AS, Oslo (NO)

( * ) Notice: Subject to any disclaimer, the term of this patent is extended or adjusted under 35 U.S.C. 154(b) by 452 days.

(21) Appl. No.: 12/596,066

(22) PCT Filed: Apr. 18, 2008

(86) PCT No.: PCT/NO2008/000140
§ 371 (c)(1),
(2), (4) Date: Feb. 18, 2010

(87) PCT Pub. No.: WO2008/130244
PCT Pub. Date: Oct. 30, 2008

(65) Prior Publication Data
US 2010/0139536 A1 Jun. 10, 2010

(30) Foreign Application Priority Data
Apr. 18, 2007 (NO) .................................... 20071983

(51) Int. Cl.
*B01D 53/62* (2006.01)
*B01D 53/78* (2006.01)
*B01D 53/96* (2006.01)
*F02C 3/20* (2006.01)

(52) U.S. Cl.
USPC ............................ 423/228; 423/220; 423/226

(58) Field of Classification Search
USPC ........ 423/220, 226, 228, 229; 60/39.01, 39.5, 60/721
See application file for complete search history.

(56) References Cited

U.S. PATENT DOCUMENTS

| 3,563,695 A | 2/1971 | Benson |
| 3,725,529 A | 4/1973 | Giammarco et al. |
| 4,044,100 A * | 8/1977 | McElroy, Jr. ................. 423/226 |
| 4,079,117 A | 3/1978 | Butwell |
| 4,112,051 A | 9/1978 | Sartori et al. |
| 4,397,660 A | 8/1983 | Van der Pas-Toornstra |
| 4,942,734 A | 7/1990 | Markbreiter et al. |
| 5,061,465 A | 10/1991 | Carter |
| 5,318,758 A | 6/1994 | Fujii et al. |
| 5,339,633 A | 8/1994 | Fujii et al. |
| 5,528,811 A | 6/1996 | Abidin et al. |
| 2007/0006565 A1 | 1/2007 | Fleischer et al. |

FOREIGN PATENT DOCUMENTS

| EP | 0502596 A1 | 9/1992 |
| GB | 2331526 A | 5/1999 |
| NO | 321817 | 7/2006 |
| WO | WO-2005/045316 A2 | 5/2005 |

(Continued)

OTHER PUBLICATIONS

U.S. Appl. No. 12/529,952, Lund et al.
Persichini, Carlo, "International Search Report for PCT/NO2008/000078" as completed Jun. 20, 2008, (5 pages).

(Continued)

*Primary Examiner* — Stuart Hendrickson
*Assistant Examiner* — Daniel Berns
(74) *Attorney, Agent, or Firm* — Winstead PC

(57) ABSTRACT

A method and a plant for capturing $CO_2$ from an exhaust gas from combustion of carbonaceous material are described. At least a part of the combustion gas is introduced into a biol fuel boiler as an oxygen containing gas, to increase the concentration of $CO_2$ and decrease the oxygen concentration in the gas before introduction into an absorption column for separation of $CO_2$.

5 Claims, 4 Drawing Sheets

(56) References Cited

FOREIGN PATENT DOCUMENTS

Figure 1:
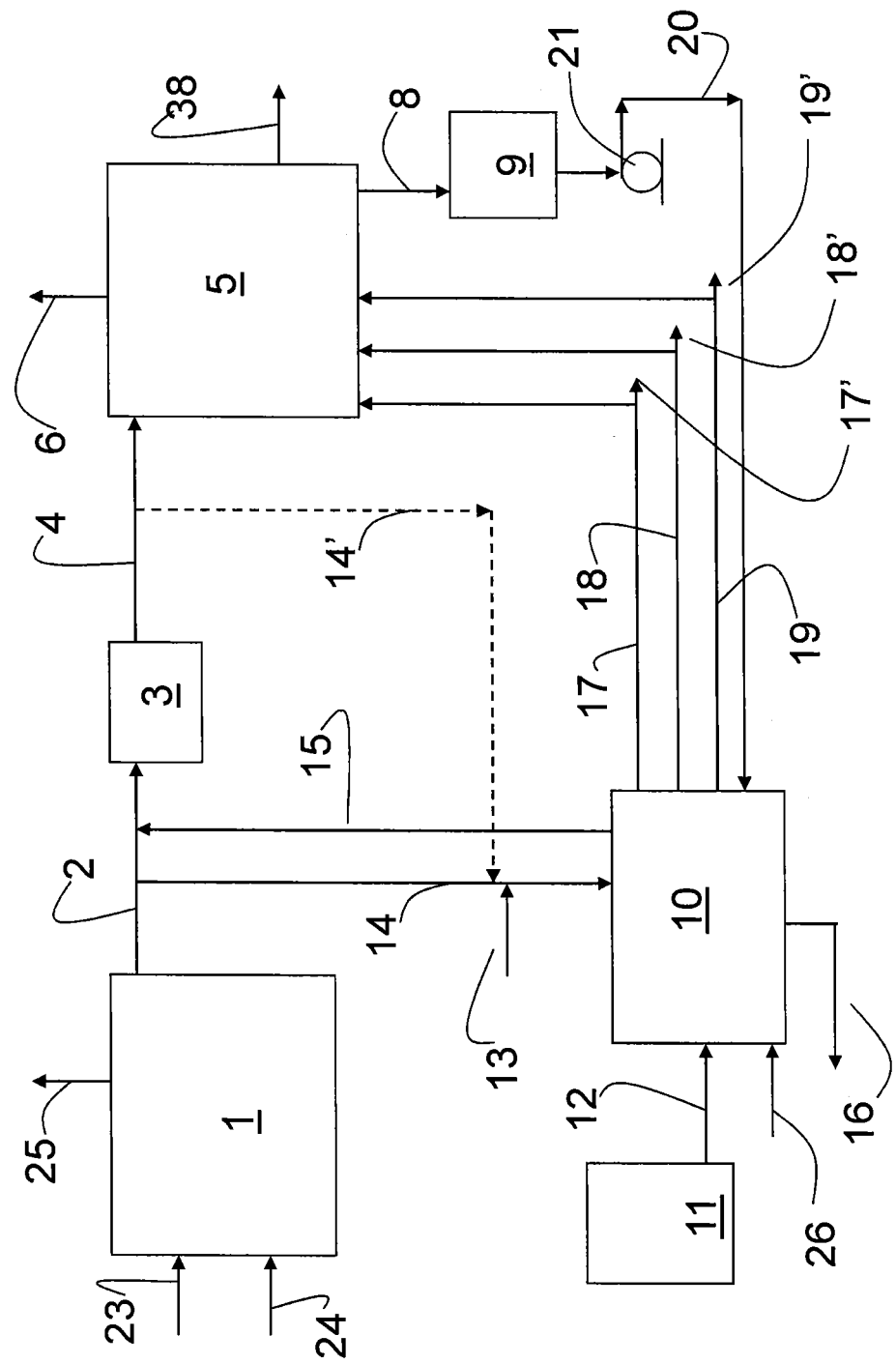

| WO | WO-2005/087350 | A1 | 9/2005 |
| WO | WO-2006/043820 | A1 | 4/2006 |
| WO | WO-2008/063079 | A2 | 5/2008 |
| WO | WO-2008/063082 | A2 | 5/2008 |

OTHER PUBLICATIONS

Persichini, Carlo, "International Search Report" for PCT/NO2008/000140 as mailed Jul. 31, 2008 (3 pages).

Tel-Tek, "Treflis brukt til CO2-fangst", Sluttrapport, Tel-Tek, Report No. 2106040-1, Jun. 2006 (19 pages).

\* cited by examiner

METHOD AND PLANT FOR CO₂ CAPTURING

TECHNICAL FIELD

The present invention relates to field of $CO_2$ capture from the exhaust from combustion of carbonaceous fuel.

BACKGROUND

The continually increasing combustion of fossil fuel, such as coal, natural gas and oil, during the last centuries has resulted in an increase in the concentration of $CO_2$ in the atmosphere. The increasing concentration of $CO_2$ has caused concern due to the greenhouse effect caused by $CO_2$. The greenhouse effect is suspected already to have caused at least some of the changes in the climate that have been seen during the last decades, and is according to simulation models suspected to cause even more and potentially dramatic changes in the climate of planet earth.

This has caused a call for action from scientists, environmentalists and politicians throughout the world, to stabilize or even reduce the discharge of $CO_2$ from combustion of fossil fuel to the atmosphere. This may be achieved by capturing and safe depositing of $CO_2$ from the exhaust gas from thermal power plants and other plants where fossil fuel is combusted.

The captured $CO_2$ may be injected in sub terrain formations such as aquifers, oil wells for enhanced oil recovery or in depleted oil and gas wells for deposition. Tests indicate that $CO_2$ remains in the sub terrain formation for thousands of years and is not released into the atmosphere.

The capture of CO2 resulting from combustion of biofuel is also considered as a method of reducing CO2 emissions to the atmosphere. Biofuel is considered a renewable fuel and combustion of biofuel has no effect upon CO2 concentrations in the atmosphere. Capturing CO2 from the exhaust from a biofuel plant will reduce the CO2 concentrations in the atmosphere.

Capturing of $CO_2$ from a gas by means of absorption is well known and has been used for decades, e.g. for removal of $CO_2$ (and other acid gases) from produced natural gas at gas fields. The absorbents used or suggested in the prior art have been different aqueous alkaline solutions, such as potassium carbonate, see e.g. U.S. Pat. No. 5,528,811, and different amines, see e.g. U.S. Pat. No. 4,112,051, U.S. Pat. No. 4,397,660 and U.S. Pat. No. 5,061,465. Additionally, an aqueous ammonia solution has been suggested as an absorbent for $CO_2$. Separation of $CO_2$ from exhaust gas from thermal power plants by means of an amine solution, is known e.g. from U.S. Pat. No. 4,942,734.

Common for these $CO_2$ capturing solution is that the gas mixture to be separated is introduced countercurrent to the aqueous adsorbent in an absorber column. The gas leaving the absorber column is $CO_2$ depleted (or acid gas depleted), whereas the $CO_2$ (or other acid gas) leaves the absorber column together with the absorbent. The absorbent is regenerated in the regenerator column and returned to the absorber column. Amine is regenerated by stripping the amine solution with steam in the regeneration column. The steam is generated in the reboiler at the base of the column.

As illustrated above $CO_2$ as such is well known in the art. However, there is a need for several improvements in the $CO_2$ capturing process to make $CO_2$ free or low $CO_2$ emission thermal power plants economically profitable.

Capturing of $CO_2$ is carried out at the expense of the efficiency of a thermoelectric power plant utilizing fossil fuel, so that the output of electrical power and/or medium temperature heat from a thermoelectric power plant is reduced. The reduced efficiency compared with a traditional plant makes these facilities less profitable. Improvements in the efficiency, i.e. reducing the energy cost in the $CO_2$ capturing process, are therefore sought.

The currently preferred absorbents are aqueous solutions of different amines. The commonly used amines are alkanol amines, such as e.g., diethanol amine, mono methyl ethanolamine, aminoethyl ethanolamine, 2-(Methylamino)ethanol, MDEA as well as other amines known by skilled man in the art. The absorption of $CO_2$ to the amine absorbents is a reversible, exothermic reaction. Accordingly, heat has to be supplied to the regenerator column to reverse the absorption and release the $CO_2$. NO321817 (corresponding to WO2005/045316) describes a method and plant for capturing $CO_2$ from a thermal power plant, where the flue gas from the power plant is cooled, compressed and used as an oxygen containing gas, optionally with added air or oxygen, in a pressurized combustion chamber for combustion of natural gas. The combustion in the pressurized combustion chamber is substantially stoichiometric, resulting in an exhaust gas having a substantially reduced oxygen concentration and a higher concentration of $CO_2$. The exhaust gas from the pressurized combustion chamber is cooled and kept at the elevated pressure to allow for a more efficient absorption of $CO_2$ in an absorption device for separation of the exhaust gas to a $CO_2$ depleted fraction that is released into the surroundings, and $CO_2$ to be deposited.

WO2006/043820 describes a method for capturing $CO_2$ wherein exhaust gas from a first gas turbine is cooled and fed as oxygen containing gas into a second gas turbine. The exhaust gas from the second gas turbine is again cooled and separated into a $CO_2$ depleted fraction that is released into the surroundings, and $CO_2$ to be deposited. The two step combustion increases the concentration of $CO_2$ in the exhaust gas from the second gas turbine to be separated and thus increases the efficiency of the $CO_2$ absorption in the separation part of the plant.

Both NO 321817 and WO 2006/043820 are, however, dependent on additional supply of fossil fuel for the enrichment of $CO_2$ in the second combustion.

In Tel-Tek report No. 2106040-1 of June 2006 (Marit Larsen, Tel-Tek Dept. GassTEK, Porsgrunn, Norway) it has also been suggested to use wood chippings as a source of heat energy for the $CO_2$ absorption/desorption process. Exhaust gas from a gas power plant may be cooled by drying of wood chippings. The dry wood chippings may then be combusted in a steam boiler to produce to produce steam for the regeneration of the $CO_2$ absorbent. The combustion gas from the steam boiler may be released into the atmosphere, as the $CO_2$ is from an organic source, or be mixed with the exhaust from the gas power plant and introduced into the $CO_2$ capturing plant. Capturing $CO_2$ from combustion of wood chippings makes it possible to capture more $CO_2$ than the $CO_2$ generated from natural gas, and thus makes it possible to increase the efficiency and thus profitability of the plant. No secondary combustion using the exhaust from the gas power plant is, however, suggested or indicated as a possibility.

It is an objective of the present invention to provide a $CO_2$ capturing solution for an existing or new fossil fuel fired thermal power plant that is more energy efficient than the solution according to the prior art.

It is also an objective of the present invention to provide a $CO_2$ capturing for a fossil fuel fired thermal power plant resulting in low or no net entry of $CO_2$ of fossil origin into the atmosphere.

SHORT DESCRIPTION OF THE INVENTION

According to a first aspect, the present invention relates to a method for capturing $CO_2$ from an exhaust gas from combustion of carbonaceous material, in which method the exhaust gas is brought in countercurrent flow with a liquid $CO_2$ absorbent in a contact section of an absorption column to produce a $CO_2$ depleted exhaust gas that is released to the atmosphere and a $CO_2$ rich absorbent that is withdrawn from the absorption column, where the rich absorbent is introduced into a regeneration column where heat is supplied to the rich absorbent to give $CO_2$ that is withdrawn for further treatment and export, and lean, or regenerated absorbent that is recycled into the absorption column, wherein at least a part of the exhaust gas from the combustion of carbonaceous material is introduced as a oxygen containing gas into a biofuel boiler, before it is introduced into the absorption column. The introduction of at least parts of the exhaust gas from the first combustion into a biofuel boiler as an oxygen containing gas for the combustion therein, increases the $CO_2$ concentration in the exhaust gas and reduces the $O_2$ concentration. An increased $CO_2$ concentration increases the efficiency of the $CO_2$ absorption and makes it possible to absorb the same amount of carbon dioxide at the reduced energy cost, or to increase the total absorption of $CO_2$. The added amount of $CO_2$ produced in the biofuel boiler is regarded as environmental neutral and combustion thereof does not give a net rise in the $CO_2$ concentration in the atmosphere, and is preferred over combustion of fossil fuel to give energy for $CO_2$ absorption unit. The reduction of the oxygen concentration results in a decrease in oxygen based degradation of the absorbent.

According to a second aspect, the present invention relates to a plant for capturing $CO_2$ from an exhaust gas from combustion of carbonaceous material, comprising an exhaust gas line for transferring the exhaust gas into a $CO_2$ capturing unit comprising an absorber where $CO_2$ is absorbed from the exhaust gas by countercurrent flow of a liquid absorbent, and a regeneration column in which absorbent loaded with $CO_2$ is heated to release the $CO_2$ to leave regenerated absorbent that is recirculated to the absorber, wherein the plant additionally comprises a biofuel boiler and a line to withdraw at least a part of the exhaust gas from the combustion of carbonaceous material and introduce the exhaust gas into the biofuel boiler as an oxygen containing gas for the combustion therein.

According to a third aspect, the present invention relates to a plant comprising a power plant fired by carbonaceous fuel and a plant as described above for capturing $CO_2$ from the combustion gas of the power plant.

SHORT DESCRIPTION OF THE FIGURES

Figure 2:
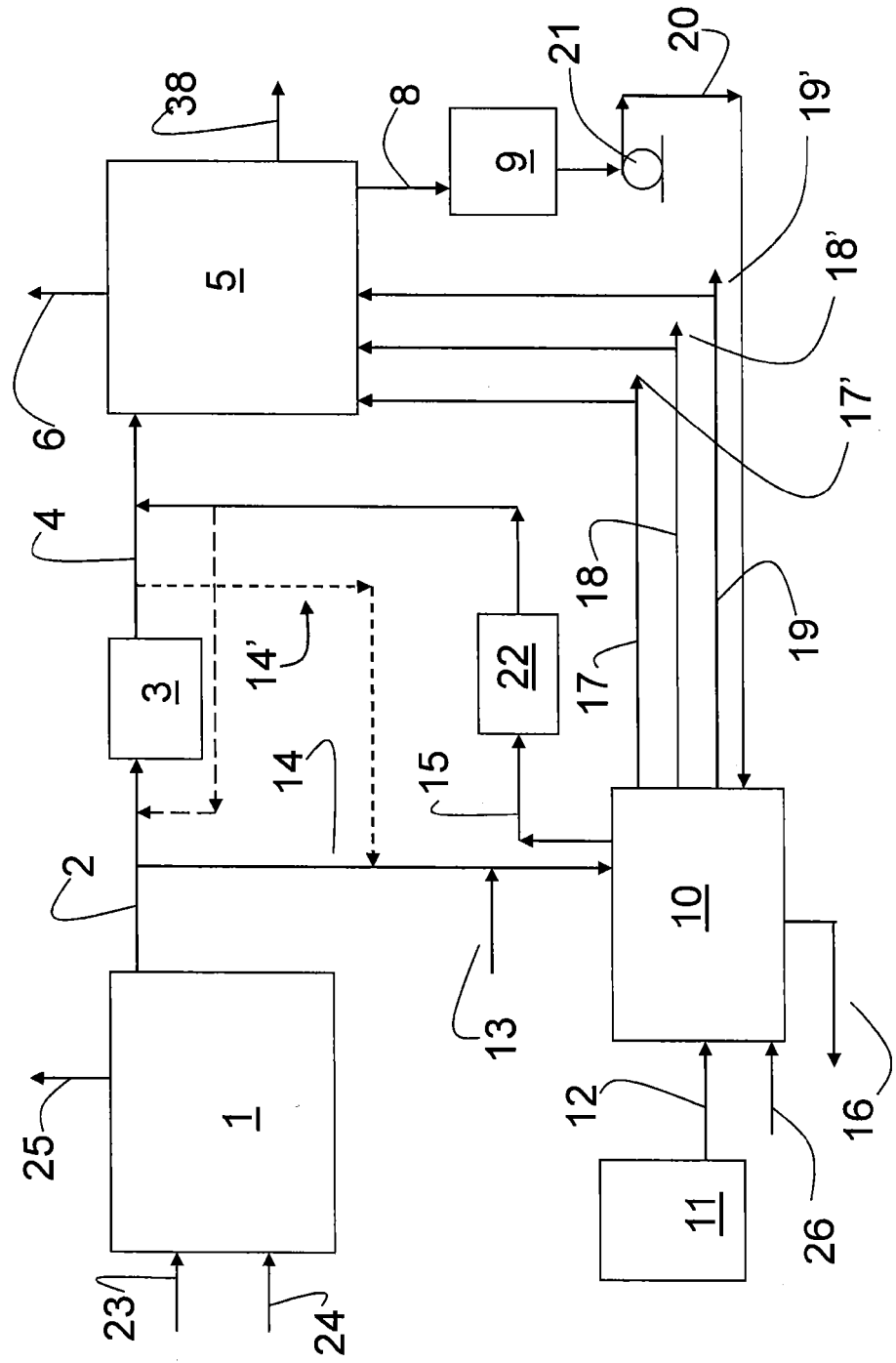
Figure 3:
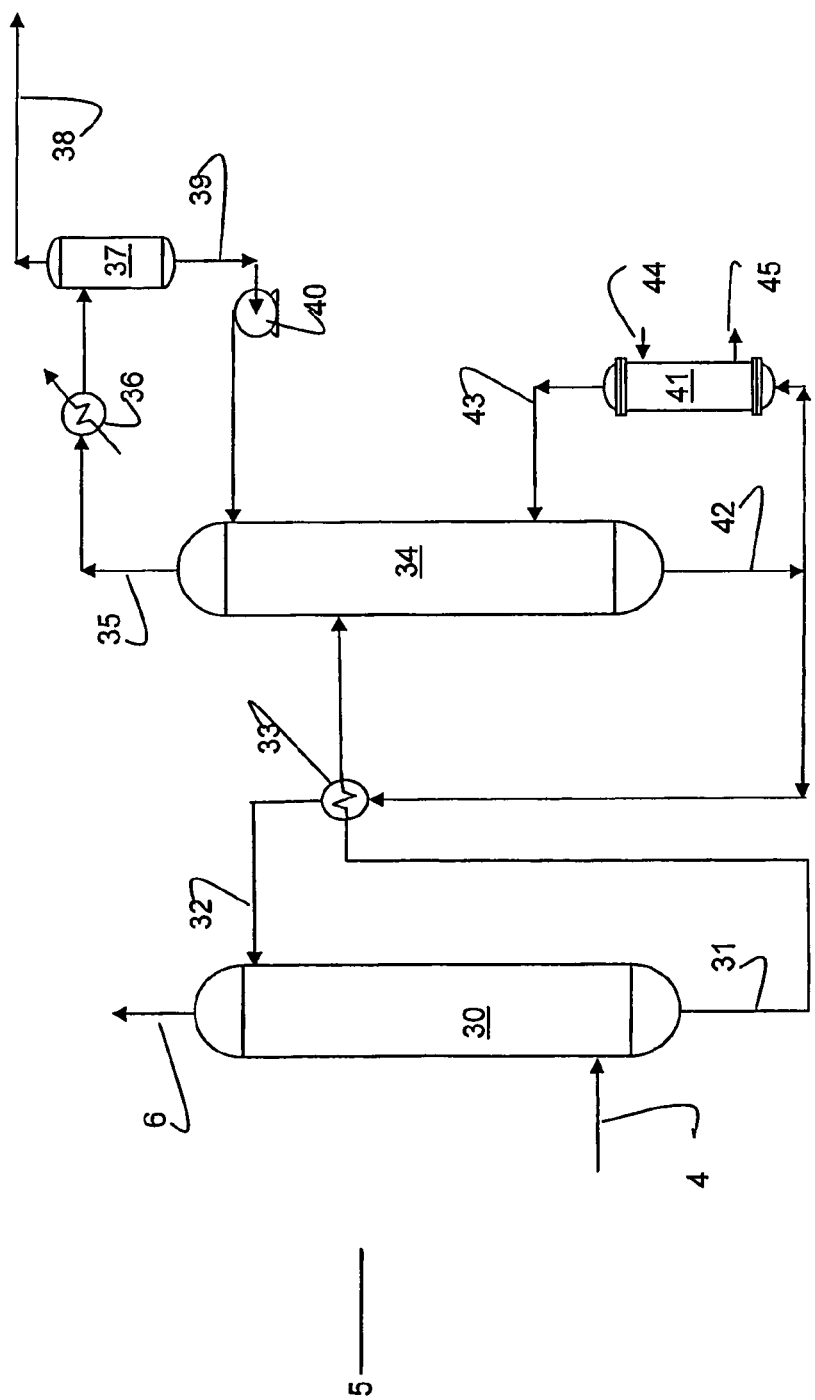
Figure 4:
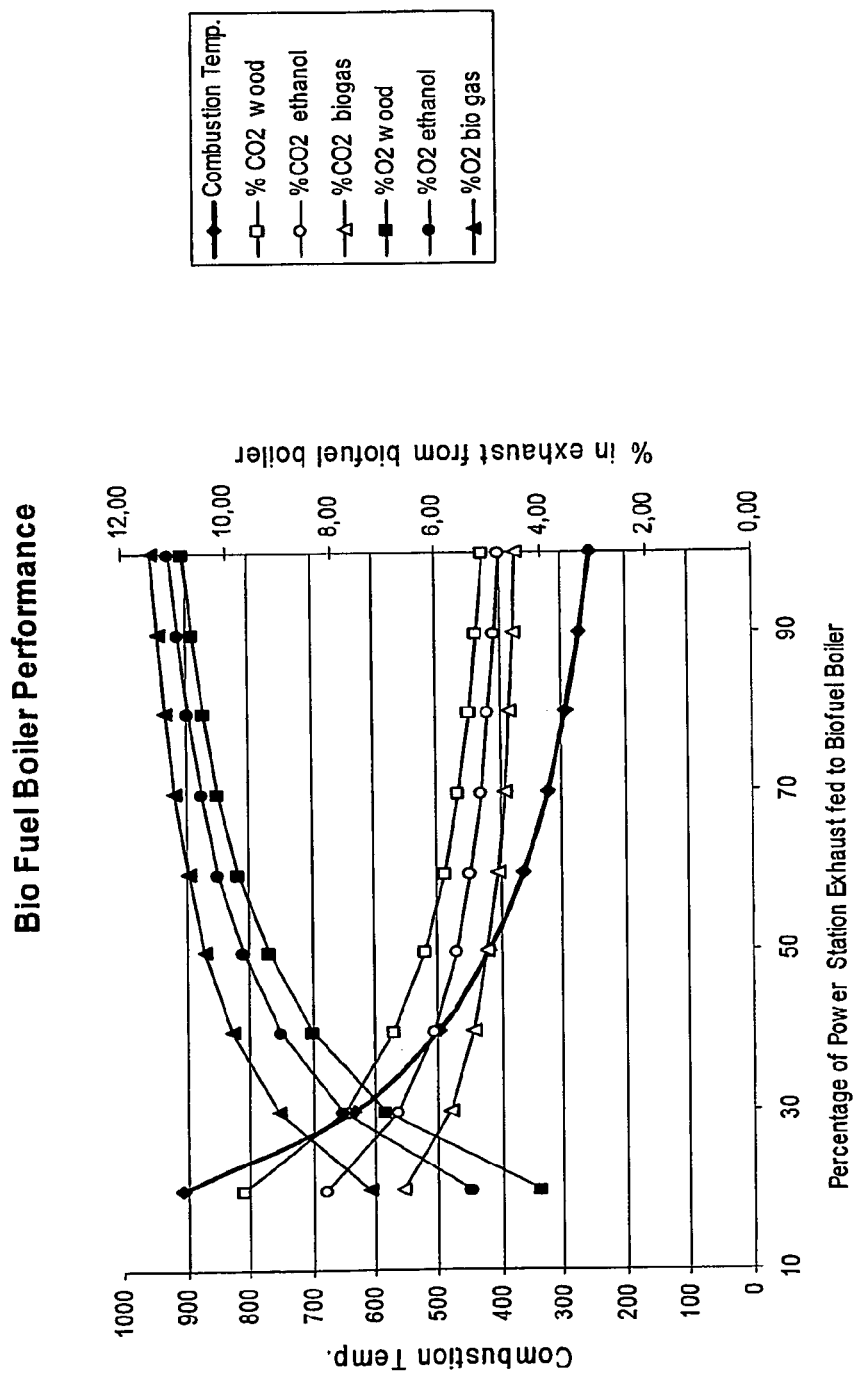

FIG. 1 illustrates an integrated system according to a first embodiment of the present invention, FIG. 2 illustrates an integrated system according to a second embodiment or the present invention, FIG. 3 illustrates a unit for $CO_2$ absorption, and FIG. 4 is a diagram illustrating the combustion temperature and % of oxygen and $CO_2$ in the combustion gas from a bio fuel boiler as a function of the power station exhaust that is fed to the biofuel boiler.

DETAILED DESCRIPTION OF THE INVENTION

FIG. 1 is an exemplary principle drawing of plant according to the present invention. FIG. 2 illustrates a variation thereof. Most elements are common for the two embodiments of FIGS. 1 and 2, and they will therefore be described together and the features separating them will be discussed separately.

The plant comprises a conventional thermal power plant 1 fired by fossil fuel, such as natural gas, oil or coal that is introduced through a fuel line 23. An oxygen containing gas, such as air or oxygen enriched air is introduced through an air line 24, and electricity and/or heat is exported from the thermal power plant through energy export line 25.

Exhaust gas from the power plant 1 is withdrawn through an exhaust gas line 2. The exhaust gas from the power plant 1 comprises $CO_2$, rest oxygen, nitrogen, water vapor and different contaminants. Depending on different factors, such as type of fuel, burner technology and different operational parameters, the content of the different constituents may vary. Typically, carbon dioxide concentration may range from about 3 to 16% and oxygen concentrations may range from 2 to 15%, depending on the type of combustion chamber and combustion parameters. For a gas turbine the rest oxygen content is typically 12-15%, whereas the rest oxygen content for a coal fired boiler may be in the range from 2 to 6%. The composition and concentration of the different contaminants, such as nitrogen oxides, sulphur oxides, particles, and other contaminants, will vary depending on the fuel and operational parameters.

The exhaust gas is normally passed to an exhaust gas treatment unit 3 for removal of nitrogen oxides, sulphur oxides, particles and other contaminants. The exhaust then passes to the $CO_2$ removal system 5, through an exhaust gas line 4.

FIG. 3 illustrates a typical $CO_2$ capturing system 5. An exhaust is introduced to an absorber 30 of the $CO_2$ removal system 5 through a line 4. In the absorber 30, $CO_2$ in the exhaust gas is absorbed by countercurrent flow of exhaust gas and a liquid absorbent that is introduced into the absorber through line 32. A $CO_2$ exhausted gas is withdrawn from the top of the absorber through a line 6, and is released into the atmosphere. A $CO_2$ rich absorbent is withdrawn from the absorber in line 31 for regeneration in a regenerator 34. A heat exchanger 33 is preferably provided to heat the $CO_2$ rich absorbent in line 31 against the absorbent in line 32.

The most common liquid $CO_2$ absorbents are amines. The absorption of $CO_2$ by amines is a reversible exothermal reaction. Additionally, heating moves the equilibrium point and results in $CO_2$ leaving the absorbent. Accordingly, heat has to be introduced to reverse the absorption in the regenerator 34 to release $CO_2$ that is withdrawn from the regenerator 34 in a $CO_2$ line 35. Regenerated or lean absorbent is withdrawn from the regenerator in a line 42.

The $CO_2$ in line 35 is cooled in a cooler 36, water is removed in a flash vessel 37 and is withdrawn through a line 39, via a pump 40 and entered into the regenerator 34. $CO_2$ is withdrawn from the flash vessel in a line 38 and is further treated for export from the plant.

A part of the lean absorbent in line 42 is re-circulated back to the absorber 30 in line 32, whereas some of the lean absorbent is circulated through a reboiler 41, receiving a heat medium, typically steam, in line 44 and returning the heat medium, typically condensed steam, in line 45. Alternatively, electrical power may be used to heat the absorbent in the reboiler. The absorbent heated in the reboiler is re-introduced into the regenerator 34 through a line 43.

According to the present invention and as illustrated in FIG. 1, a bio fuel boiler 10 for production of heat and optionally electrical power, using at least parts of the exhaust gas from the power plant 1, is provided. The biofuel boiler 10 receives biofuel from a biofuel storage 11 through a biofuel line 12. In the present description and claims, biofuel is fuel derived from biomass of recently living organisms, metabolic by-products, or processed biomass or metabolic by-products. Examples of biofuels are wood, wood chippings, bio-ethanol, methanol etc. In the present invention, a boiler is a combustion chamber comprising means for transferring the heat of combustion to a heat medium, such as e.g. water to produce steam, oil, etc.

Exhaust gas from the power plant 1 is withdrawn through a line 14, 14', and is used as oxygen containing gas for the combustion of the biofuel in the biofuel boiler 10. The pressure in the biofuel boiler is about atmospheric pressure, or slightly higher, e.g. from 1.0 to 1.3 bar, such as about 1.1 bar. Additional oxygen may optionally be provided by introduction of air, or oxygen into the exhaust gas in line 13, depending on the oxygen content of the exhaust gas and the oxygen demand of the biofuel boiler. Additionally, addition of air through line 13 may be necessary during startup of the biofuel boiler. As illustrated, exhaust may be withdrawn either before after the exhaust gas treatment unit 3, in lines 14, 14', respectively.

A fossil fuel line 26 is optionally provided to deliver fuel to the biofuel boiler, as additional fuel or to start the combustion in the biofuel boiler during a startup.

Ash from the combustion in the biofuel boiler is removed for disposal through an ash line 16, and the flue gas is withdrawn in a flue gas line 15 and returned into the exhaust gas line 2 as illustrated in FIG. 1, or is passed through a flue gas treatment unit 22 as illustrated in FIG. 2, before the treated flue gas is introduced into the treated exhaust gas from the power plant in line 4.

The choice of using separate flue gas treatment units, 3, 22, or using a common flue gas treatment unit 3 for both the flue gases from the thermal power plant and the biofuel boiler, depends on different factors. Examples on factors determining this choice are the type of fuel and combustion chamber of the thermal power plant, and the capacity of the exhaust gas treatment unit 3 of the thermal power plant. As an example, combustion of certain types of biofuel may produce dust that the gas treatment unit 3 is not prepared to handle. The flue gas treatment unit 22 for handling the flue gas from the biofuel boiler, may e.g. be a dust removing unit. Depending on the flue gas treatment unit 22 and the demands for treatment, the flue gas withdrawn from this unit may be mixed with the flue gas from the thermal power plant upstream or downstream for the exhaust gas treatment unit 3, as indicated with solid drawn line or dotted line, respectively.

The heat generated in the biofuel boiler may be utilized as high temperature steam, as medium temperature steam or to produce electricity. The high temperature steam, medium temperature steam and electricity may be transferred to the $CO_2$ capturing system 5 for energy demanding processes therein, through lines 17, 18 and 19, respectively, or exported elsewhere, through lines 17', 18' and 19', respectively. The heat and/or electricity delivered to the $CO_2$ capturing unit 5 may fully or partly replace the duty of the thermal power plant for delivery of energy to the $CO_2$ capturing unit, and may actually give a net energy surplus that may be used in other processes requiring heat.

The absorbent is partly deactivated or degraded during the absorption/desorption cycle. To keep the process continuously running at a steady state, the deactivated or degraded absorbent is removed through a waste absorbent line 8 into a waste storage tank 9 and replace by fresh absorbent. The waste absorbent may constitute an environmental problem, and may be poisonous. Waste absorbent from an amine based plant comprises amines, degraded amines, heat stable salts and other waste. Traditionally, the absorbent has been sent for treatment in a plant for handling special industrial waste. It is possible to combust these wastes in the biofuel boiler and reduce the cost of disposal of these wastes. In addition the heating value of this waste is recovered as heat generated in the biofuel boiler. The absorbent in tank 9 is therefore pumped by means of a pump 21 through a line 20 and introduced into the biofuel boiler. The flue gases from the combustion of the deactivated absorbent waste will be treated in the flue gas treatment unit together with the rest of the flue gas to avoid environmental damaging emission. Alternatively, if the power plant 1 is a coal fired power plant, the absorbent waste may be combusted therein together with the coal.

The exhaust gas from the thermal power plant will contain up to about 15% rest oxygen and will provide the oxygen required for combustion in the biofuel boiler. If the rest oxygen content is too low, or during startup of the biofuel boiler, it may be necessary to supply air to the biofuel boiler in addition to the exhaust gas.

Using the exhaust gas stream to provide oxygen for combustion will change the operating conditions within the biofuel boiler. Many of these conditions are beneficial for carbon dioxide capture, such as:

- The exhaust from the carbon dioxide boiler will have high carbon dioxide concentrations enabling more energy efficient carbon dioxide capture.
- The exhaust from the carbon dioxide boiler will have low oxygen concentrations reducing the levels of oxygen based degeneration in the carbon dioxide capture system.
- The exhaust gas used as an oxygen containing gas for the biofuel boiler will have an elevated temperature increasing the thermal efficiency of the boiler. Typically, the temperature of the exhaust gas from a thermal power plant is from 90 to 130° C. and thus taking care of this energy that conventionally is released to the surroundings.

The flue gas from the biofuel boiler is directed back and is mixed into the exhaust from the power station. The mixed exhaust streams are then passed to the carbon dioxide removal system 5. The exhaust entering the carbon dioxide removal system will have a similar or slightly higher volumetric flow rate to the exhaust exiting the power station 1. However, the carbon dioxide concentration will be higher resulting in lower energy consumption in the carbon dioxide capture system. The oxygen concentration will be lower resulting in lower levels of oxygen based degradation in the carbon dioxide capture system.

The above describes the key features of the invention. However there are addition features that can be included to improve the overall performance of the system.

Example

Calculation of Potential Energy Savings

Calculations have been made based on a plant according to FIG. 1 comprising a 400 MW gas power plant 1. The exhaust from the power station comprises 4% by volume carbon dioxide and 12.4% by volume oxygen. A 110 MW biofuel boiler 10 is provided to provide the heat in form of steam that is required in the carbon dioxide capture process. Parts or all of the exhaust from the gas fired power station is used as combustion air in the biofuel boiler. FIG. 4 gives the results for calculations to predict the performance of the biofuel boiler with different fuels and different flows of exhaust through the biofuel boiler.

The curve "Combustion Temp." depicts the combustion temperature biofuel boiler as a function of the percentage of the total exhaust gas from the gas power plant that is introduced into the biofuel boiler as oxygen containing gas. No additional oxygen containing gas is introduced into the biofuel boiler in this example. As illustrated the temperature in the boiler drops as a function of increasing volume of exhaust gas. When 20% of the exhaust gas is introduced into the biofuel boiler, the combustion temperature is about 900° C. and drops to about 250° C. if all the exhaust from the gas fired power station is passed through the biofuel boiler. Passing 50% through the biofuel boiler will give a temperature of about 400° C.

FIG. 4 also demonstrates the effect of increasing the $CO_2$ content and reducing the $O_2$ content in the exhaust gas after combustion of different biofuels in the biofuel boiler. Calculations have been performed for the use of wood, ethanol and biogas.

The effect of lowering the oxygen concentration and increasing the concentration of carbon dioxide during the combustion in the biofuel boiler is highest for wood, and lowest for biogas. As for the temperature, the effect of lowering the oxygen concentration and increasing the carbon dioxide concentration is reduced as the volume, or percentage of the exhaust gas from the gas power plant introduced into the biofuel boiler is increase. This is suggested as the total gas volume is increased without increasing the combustible matter, i.e. the biofuel. However, if only a part of the total exhaust gas from the gas power plant is passed through the biofuel boiler, the flue gas from the biofuel boiler is mixed with the exhaust gas from the gas power plant, to reduce the oxygen concentration and increase the carbon dioxide concentration in the total mixture.

As an example, by passing all the exhaust from the gas fired power station through the biofuel boiler will result in an increase of the carbon dioxide concentration from 4% by volume to up to 5.4% by volume, and the oxygen concentration is reduced from about 12.4% by volume to between 11% by volume and 11.5% by volume.

The dimension of the absorbent column is basically dependent on the total volume flow through the column and not the amount of CO2 to in the gas. Additionally, to remove the same quantity of carbon dioxide from the exhaust gas, increasing the carbon dioxide concentration from 4% to 5.4% will result in a heat consumption reduction of up to 10% in the carbon dioxide capture regeneration system. Additionally, if 85% of the carbon dioxide in the combined exhaust from power station and biofuel boiler is removed, the resulting $CO_2$ capture rate for the gas power station could increase from 85% to 116% as a result of capturing $CO_2$ from neutral biofuel. In other words, the result may be a negative emission of CO2 into the environment.

What is claimed is:

1. A method for capturing $CO_2$ from an exhaust gas from combustion of carbonaceous material, in which method the exhaust gas is brought in countercurrent flow with a liquid alkanol amine $CO_2$ absorbent in a contact section of an absorption column to produce a $CO_2$ depleted exhaust gas that is released to the atmosphere and a $CO_2$ rich absorbent that is withdrawn from the absorption column, where the $CO_2$ rich absorbent is introduced into a regeneration column, wherein the $CO_2$ rich absorbent is regenerated, where heat is supplied to the $CO_2$ rich absorbent to give $CO_2$ that is withdrawn for further treatment and export, and lean, or regenerated absorbent is recycled into the absorption column, wherein a portion of the $CO_2$ rich absorbent is deactivated or degraded during absorption and/or desorption, wherein at least a part of the exhaust gas from the combustion of carbonaceous material is introduced as an oxygen containing gas into a biofuel boiler for the combustion of the biofuel to produce heat, before the exhaust gas is introduced into the absorption column, wherein the deactivated or degraded absorbent is withdrawn from the regeneration column and wherein the deactivated or degraded absorbent is combusted in the biofuel boiler.

2. The method according to claim 1, wherein the exhaust gas from combustion of carbonaceous material is exhaust gas from a thermal power plant fired by fossil fuel.

3. The method according to claim 1, wherein all the exhaust gas from the combustion of carbonaceous material is introduced into the biofuel boiler.

4. The method according to claim 1, wherein at least parts of the heat produced in the biofuel boiler is directly or indirectly used for energy demanding processes in the regeneration of absorbent, and any additional energy may be exported.

5. The method of claim 4, wherein at least parts of the heat produced in the biofuel boiler is used to produce electrical power for use in the regeneration process, and any additional electric power may be exported.

* * * * *

UNITED STATES PATENT AND TRADEMARK OFFICE
CERTIFICATE OF CORRECTION

PATENT NO.      : 8,641,994 B2                                          Page 1 of 1
APPLICATION NO. : 12/596066
DATED           : February 4, 2014
INVENTOR(S)     : Woodhouse et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 697 days.

Signed and Sealed this

Twenty-second Day of September, 2015

Michelle K. Lee
*Director of the United States Patent and Trademark Office*